UNITED STATES PATENT OFFICE.

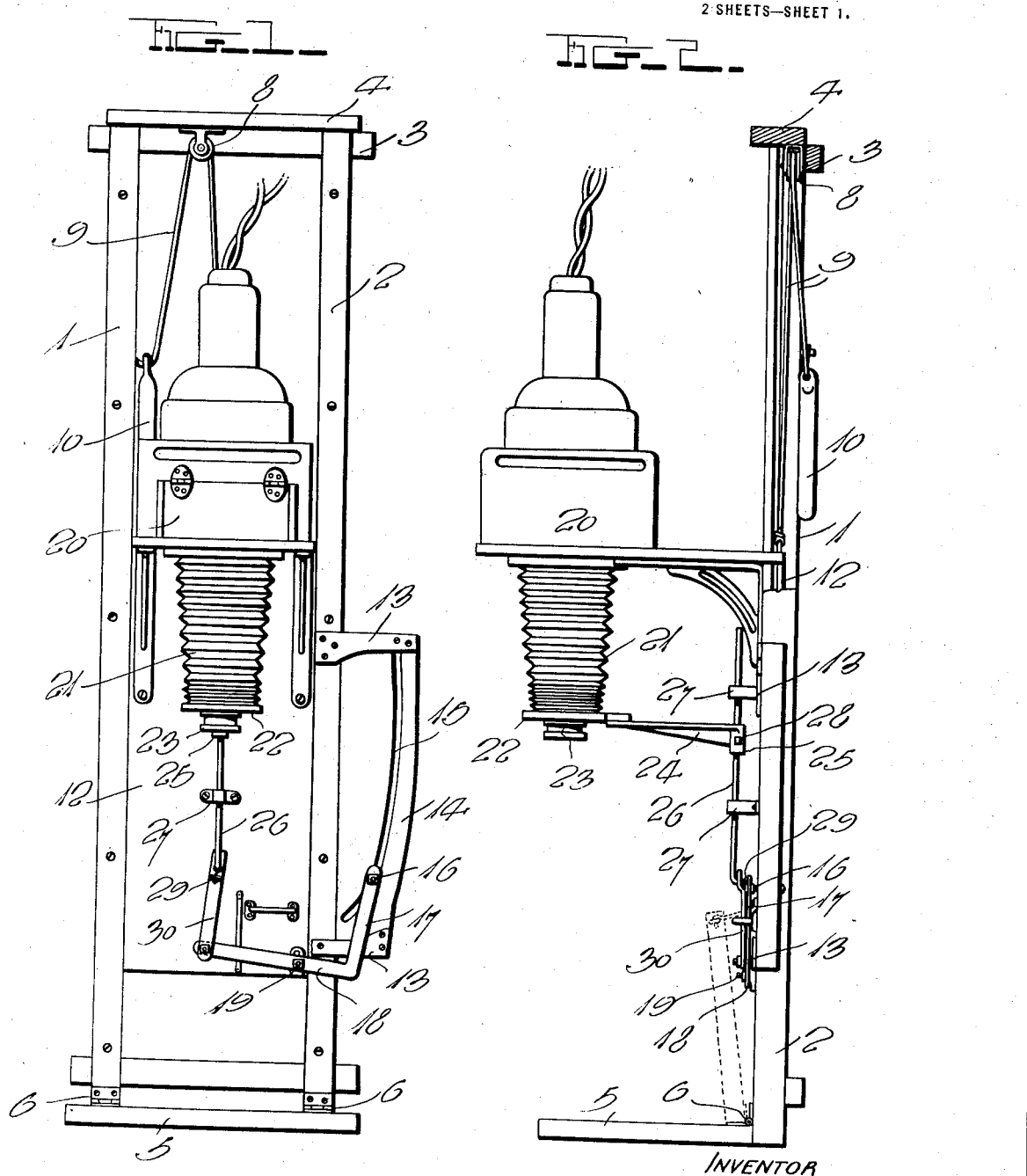

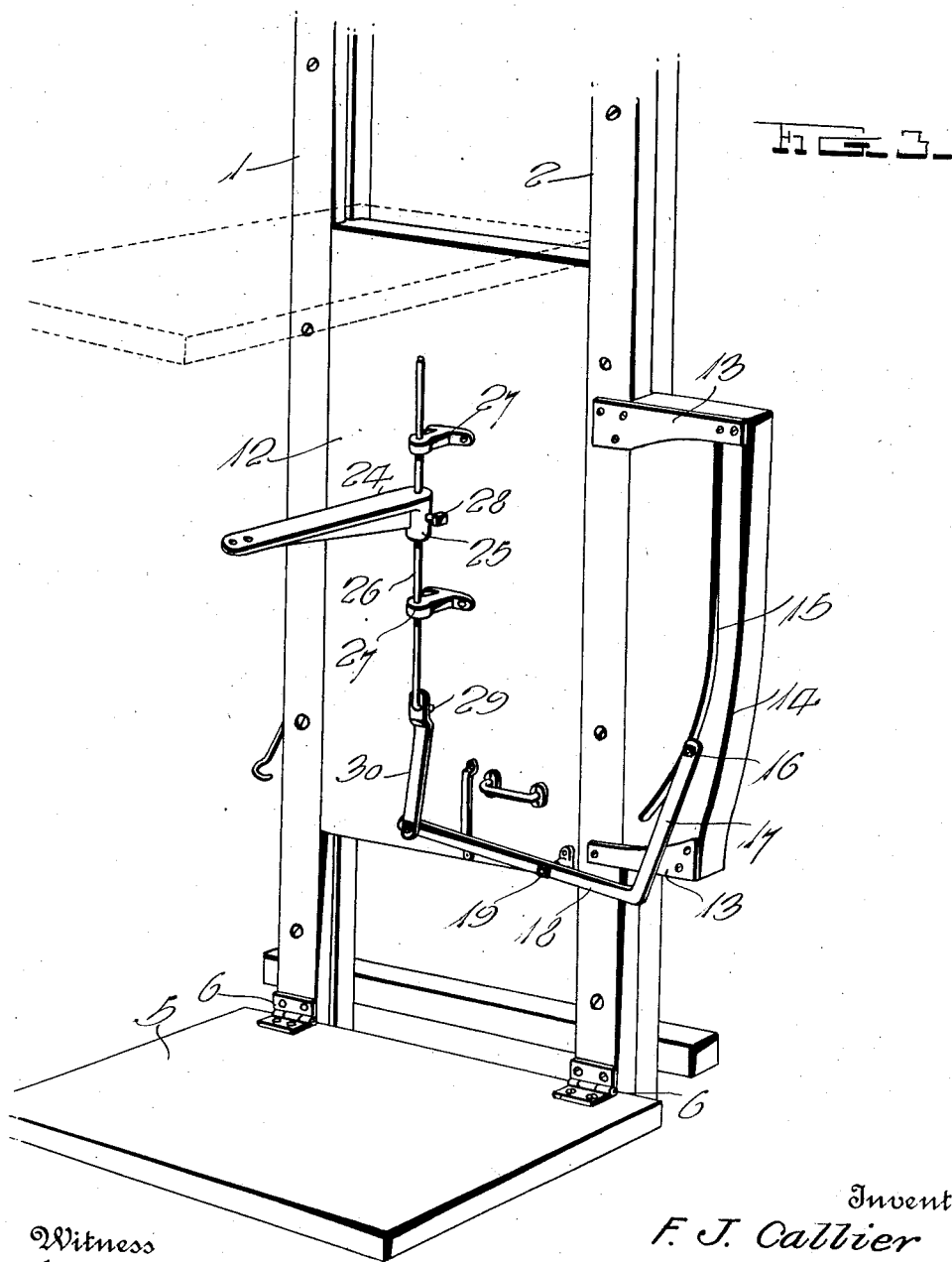

FELIX J. CALLIER, OF BRUSH, COLORADO.

AUTOMATIC FOCUSING DEVICE FOR ENLARGING CAMERAS.

1,423,997. Specification of Letters Patent. Patented July 25, 1922.

Application filed March 21, 1921. Serial No. 453,874.

*To all whom it may concern:*

Be it known that I, FELIX J. CALLIER, a citizen of the United States, residing at Brush, in the county of Morgan and State of Colorado, have invented certain new and useful Improvements in Automatic Focusing Devices for Enlarging Cameras; and I do declare the following to be a full, clear, and exact description of the invention, such as will enable others skilled in the art to which it appertains to make and use the same.

This invention relates to an improved focusing device for use in connection with an enlarging camera, and one object of the invention is to provide an improved type of structure for mounting the camera and improved means for adjusting the bellows of the camera as the camera is moved towards or away from the support for the sensitive paper upon which the enlargement is to be made.

Another object of the invention is to provide an improved type of actuating lever for imparting movement to the lens carrying board and to provide improved cam means engaged by the lever and improved means for connecting the lever with the lens carrying board.

Another object of the invention is to so construct the connecting means between the lever and the lens carrying board that this connection may be adjusted to accommodate the device to cameras having different types of lenses.

Another object of the invention is to so construct the main frame and camera carrying frame that t'.e device may be mounted adjacent a wall where the device will be out of the way and take up a small amount of room.

Another object of the invention is to provide a device of the character described which will be very simple in construction and very easy to operate.

This invention is illustrated in the accompanying drawings, wherein:

Figure 1 is a view showing the improved device in front elevation, a camera being shown in place.

Figure 2 is a view showing the structure of Fig. 1 partially in side elevation and partially in vertical section.

Figure 3 is a perspective view of the lower portion of the device.

This improved device is provided with a main frame which may be termed a track frame and is provided with side bars 1 and 2 having their upper ends connected by a cross bar 3 and an outstanding ledge 4 and their lower ends connected with a platform 5 by hinges 6 so that this platform 5 may be swung up out of the way when not in use. The ledge 4 carries a pulley 8 over which passes a line or cable 9 which carries a weight 10 and has one end connected with the side bar 1 and has its second end connected with the upper end of the camera carrying board or frame 12 slidably mounted between the side bars 1 and 2. Brackets 13 are secured to the side bar 2 and these brackets carry a cam strip 14 having a cam slot or groove 15 formed therein to receive the pin 16 carried by the arm 17 of the lever 18. This lever 18 is pivotally connected with the camera frame 12 by means of a pivot pin 19. It will be readily seen that as the camera carrying frame moves vertically of the track frame, the lever 18 will be swung upon its pivot 19, the inner end of the lever 18 swinging upwardly as the camera carrying frame 12 moves upwardly, and the inner end portion of this lever 18 swings downwardly as the camera frame moves downwardly. The enlarging camera 20 is of a conventional construction and secured to the camera carrying frame in any suitable manner and is provided with the usual bellows 21 at one end of which is provided a board 22 which carries the lens 23. This board 22 has a bracket arm 24 secured to its under or outer face and the arm 24 is provided with a depending sleeve through which passes a rod 26 slidably mounted in bearings 27 carried by the board or frame 12. A set-screw 28 is provided to securely but releasably lock the arm 24 in a set position upon the rod 26. The lower end of the rod 26 is bent to provide a pin 29 which fits into an opening in the upper end of a link 30, the lower end of which is pivotally connected with the inner end of the lever 18. By having the arm 24 adjustable upon the rod 26, the proper adjustment may be made to secure the lens at the desired distance from the end of the lever and provide the proper focus when the lever is at the point to provide a reproduction at natural size.

When this device is in use, the track frame will be mounted adjacent the wall and preferably will be connected with the wall so that it will be securely held in an upright position. The sensitive paper will be placed upon the platform 5 which has been swung down to the position of Fig. 3, and the camera will be moved vertically by sliding the camera carrying frame vertically between the track bars 1 and 2 of the track frame. As the camera carrying frame moves vertically, the pin 16 moves along the groove 15 which curves longitudinally and has its lower end portion carried inwardly toward the bar 2. The lower end portion of this groove has a greater curve than the upper portion and it will thus be seen that a greater amount of adjustment will be given while the pin is moving through the lower portion of the groove. As this pin moves through the groove, the lever 18 is swung upon its pivot 19 and the lens carrying board 22 will be moved upwardly or downwardly according to the direction in which the camera carrying frame is moving. As previously explained, the board 22 is moved upwardly as the camera carrying frame moves upwardly and is drawn downwardly as the camera carrying frame moves downwardly. It will thus be seen that the lens carrying board will be automatically adjusted to provide the proper focus as the camera is moved vertically. Therefore, it is only necessary to move the camera to the proper position according to the size of the reproduction desired, and the lens will be properly focused to produce a clear picture. When the camera is not in use, it can be moved upwardly out of the way and the platform 5 swung upwardly out of the way. The device will take up a comparatively small amount of space and will not be in the way.

I claim:

1. A device of the character described comprising a track, a camera carrying frame movable longitudinally of said track, a lever pivoted to said camera carrying frame, a cam element having engagement with said lever for imparting rocking movement to the lever as the camera carrying frame moves longitudinally of the track, and means connecting the inner end portion of the lever with the lens carrying board of a camera, said means including a board engaging element adjustable longitudinally of the means towards and away from the lever.

2. A device of the character described comprising a track, a camera carrying frame movable longitudinally thereof, a lever pivoted to said camera carrying frame and having its outer end portion extending transversely of its inner end portion, a cam element having connection with the outer end of said lever for imparting rocking movement to the same as the camera carrying frame moves longitudinally of said track frame, and means for connecting the inner end portion of said lever with the lens carrying board of a camera bellows.

3. A device of the character described comprising a track, a camera carrier movable longitudinally thereof, a lever pivoted to said camera carrier, means for imparting swinging movement to the lever as the camera carrier moves longitudinally of said track, a bracket for connection with the lens carrying board of a camera, said bracket being provided with a sleeve at its inner end, a rod extending longitudinally of said camera carrier and slidably connected therewith, the sleeve of said bracket being slidably mounted upon said rod and releasably held in a set position thereon, and a link loosely connected with the lower end of the rod and the inner end portion of said lever.

4. A device of the character described comprising a track, a camera carrying frame slidable longitudinally thereof, a lever pivoted to said camera carrying frame, means for imparting swinging movement to said lever as said camera carrying frame moves longitudinally of said track frame, a bracket for connection with the lens carrying board of a camera having a neck extension forming a sleeve, a link pivotally connected with said lever, a rod loosely connected with said link and slidably mounted for movement longitudinally of the camera carrying board and passing through said sleeve, and means releasably holding the sleeve in a set position upon the rod.

5. A device of the character described comprising a track including side bars, a camera carrying frame positioned between and slidable longitudinally of the side bars of said track, a paper support connected with the lower end portions of the side bars of said track frame, an actuating lever pivoted to said camera carrying frame, cam means to one side of said track frame having connection with said lever for imparting swinging movement to the same as the camera carrying frame moves longitudinally of said track, an element slidably connected with the camera carrying frame for movement longitudinally thereof, said element being connected with the inner end portion of said lever, and means for engaging the lens carrying board of a camera connected with said element for adjustment longitudinally thereof.

6. A device of the character described comprising a track, a camera carrier movable longitudinally thereof, a lever pivoted to said camera carrier, means for imparting swinging movement to the lever as the camera carrier moves longitudinally of the track, a rod extending longitudinally of said camera carrier and slidably connected therewith, lens board engaging means adjustably connected with said rod and extending therefrom for connection with the lens board of a camera, and means connecting the lower end of the rod with the inner end portion of said lever.

In testimony whereof I have hereunto set my hand.

FELIX J. CALLIER.